(12) United States Patent
Yang

(10) Patent No.: US 9,869,361 B1
(45) Date of Patent: Jan. 16, 2018

(54) IMPACT ABSORBING STRUCTURE

(71) Applicant: Universal Trim Supply Co., Ltd., New Taipei (TW)

(72) Inventor: Shih-Sheng Yang, Taipei (TW)

(73) Assignee: Universal Trim Supply Co., Ltd., New Taipei (TW)

( * ) Notice: Subject to any disclaimer, the term of this patent is extended or adjusted under 35 U.S.C. 154(b) by 0 days.

(21) Appl. No.: 15/235,110

(22) Filed: Aug. 12, 2016

(51) Int. Cl.
*F16F 9/04* (2006.01)
*A43B 21/28* (2006.01)
*F16F 15/02* (2006.01)

(52) U.S. Cl.
CPC .......... *F16F 9/0472* (2013.01); *F16F 15/022* (2013.01); *A43B 21/28* (2013.01); *F16F 2222/126* (2013.01); *F16F 2232/08* (2013.01); *F16F 2236/045* (2013.01)

(58) Field of Classification Search
CPC ...... A43B 21/28; A43B 21/285; F16F 9/0472; F16F 9/049; F16F 9/04; F16F 9/0436; F16F 9/0409; F16F 9/0418; F16F 15/022; F16F 2232/08; F16F 2236/045; F16F 2222/126
USPC .......................................................... 36/35 B
See application file for complete search history.

(56) References Cited

U.S. PATENT DOCUMENTS

| | | | | |
|---|---|---|---|---|
| 2,596,031 A | * | 5/1952 | Kaufman | B60G 17/0485 217/54 |
| 4,178,015 A | * | 12/1979 | Merriman | F16F 9/0418 267/64.27 |
| 4,358,902 A | * | 11/1982 | Cole | A43B 13/203 36/28 |
| 4,446,634 A | * | 5/1984 | Johnson | A43B 13/203 36/28 |
| 4,912,861 A | * | 4/1990 | Huang | A43B 5/0407 36/29 |
| 5,950,332 A | * | 9/1999 | Lain | A43B 17/035 36/147 |
| 6,519,873 B1 | * | 2/2003 | Buttigieg | A43B 1/0018 36/29 |
| 6,745,499 B2 | * | 6/2004 | Christensen | A43B 13/203 36/29 |
| 6,845,573 B2 | * | 1/2005 | Litchfield | A43B 13/203 36/141 |
| 7,409,779 B2 | * | 8/2008 | Dojan | A43B 7/144 36/29 |

(Continued)

FOREIGN PATENT DOCUMENTS

WO    WO 95/20332 A1 *  8/1995  ............. A43B 13/18

*Primary Examiner* — Thomas J Williams
(74) *Attorney, Agent, or Firm* — Winston Hsu

(57) ABSTRACT

An impact absorbing structure includes a lower cover, an upper cover, a first air bag, a second air bag, a communicating channel, and a buffering component. The upper cover covers the lower cover. The first air bag and the second air bag are disposed between the lower cover and the upper cover. The communicating channel is installed between the first air bag and the second air bag for communicating the first air bag and the second air bag. The buffering component is installed in the communicating channel. When the impact absorbing structure is forced by a force to compress the first air bag, an air inside the first air bag is driven to flow into the second air bag through the communicating channel, and the buffering component reduces a flowing rate of the air, which provides an enhanced buffering effect for absorbing an impact of the force.

9 Claims, 6 Drawing Sheets

(56) References Cited

U.S. PATENT DOCUMENTS

| | | | | |
|---|---|---|---|---|
| 8,015,730 B2* | 9/2011 | Hazenberg | ............ | A43B 13/203 |
| | | | | 36/29 |
| 8,037,623 B2* | 10/2011 | Passke | ................... | A43B 7/081 |
| | | | | 36/153 |
| 9,486,037 B2* | 11/2016 | Cook | ................... | A43B 13/026 |
| 2013/0326819 A1* | 12/2013 | Wyman | ................. | A47C 27/15 |
| | | | | 5/738 |
| 2014/0103587 A1* | 4/2014 | Yang | ................... | A41D 31/005 |
| | | | | 267/140.13 |

* cited by examiner

IMPACT ABSORBING STRUCTURE

BACKGROUND OF THE INVENTION

1. Field of the Invention

The present invention relates to an impact absorbing structure, and more particularly, to an impact absorbing structure with an enhanced buffering effect.

2. Description of the Prior Art

Impact absorbing structures are widely used in different products, such as helmets, chair cushions, back cushions, shoe cushions, to absorb impacts for increasing utilization comfort and reducing a risk of serious injuries. When an external force acts on a conventional impact absorbing structure, the conventional impact absorbing structure is forced to be compressed, so as to expel an air inside a chamber of the conventional impact absorbing structure to the outside atmosphere of the conventional impact absorbing structure. That is, the impact absorbing structure can provide a buffering effect to absorb an impact of the external force by deformation and ventilation. Furthermore, there is another conventional impact absorbing structure including a foam component disposed inside the chamber. The foam component can provide an extra resistant force against the external force, which extends operational periods of the deformation and the ventilation and enhances the buffering effect. However, the conventional impact absorbing structure still cannot provide a good buffering effect enough.

SUMMARY OF THE INVENTION

Therefore, an objective of the present invention is to provide an impact absorbing structure with an enhanced buffering effect for solving aforementioned problems.

In order to achieve the aforementioned objective, the present invention discloses an impact absorbing structure including a lower cover, an upper cover, a first air bag, a second air bag, a communicating channel, and a buffering component. The upper cover covers the lower cover. The first air bag is disposed between the lower cover and the upper cover. The second air bag is disposed between the lower cover and the upper cover. The communicating channel is installed between the first air bag and the second air bag for communicating the first air bag and the second air bag. The buffering component is installed in the communicating channel for reducing a flowing rate of an air inside one of the first air bag and the second air bag flowing from the one of the first air bag and the second air bag into the other one of the first air bag and the second air bag. When the one of the first air bag and the second air bag is compressed, the air inside the one of the first air bag and the second air bag is driven to flow into the other one of the first air bag and the second air bag through the communicating channel.

According to an embodiment of the present invention, the buffering component is made of foam material.

According to an embodiment of the present invention, the impact absorbing structure further includes a one-way valve or a two-way valve disposed in the communicating channel for restraining a flowing direction of the air.

According to an embodiment of the present invention, the upper cover includes a first upper portion and a second upper portion. The lower cover includes a first lower portion and a second lower portion. A first chamber is formed between the first upper portion and the first lower portion. A second chamber is formed between the second upper portion and the second lower portion. The first chamber communicates with the second chamber. The first air bag is disposed in the first chamber, and the second air bag is disposed in the second chamber.

According to an embodiment of the present invention, a discharging channel is formed between the upper cover and the lower cover and communicated with the first chamber, the second chamber, and an outside of the impact absorbing structure. An air inside one of the first chamber and the second chamber flows into the other one of the first chamber and the second chamber and toward the outside of the impact absorbing structure when the one of the first chamber and the second chamber is compressed.

According to an embodiment of the present invention, the discharging channel is formed in a T shape.

According to an embodiment of the present invention, the impact absorbing structure further includes a first foam component and a second foam component. The first foam component is disposed between the first air bag and the first upper portion or between the first air bag and the first lower portion. The second foam component is disposed between the second air bag and the second upper portion or between the second air bag and the second lower portion.

According to an embodiment of the present invention, the impact absorbing structure further includes a third air bag disposed in the first chamber and communicated with the first air bag and the second air bag via the communicating channel.

According to an embodiment of the present invention, the impact absorbing structure further includes a fourth air bag disposed in the second chamber and communicated with the first air bag, the second air bag, and the third air bag via the communicating channel.

According to an embodiment of the present invention, the lower cover and the upper cover are bendable, and the first air bag and the second air bag are stacked when the lower cover and the upper cover are bent at a folded position.

According to an embodiment of the present invention, the first air bag and the second air bag are located in a same horizontal plane when the lower cover and the upper cover are not bent at an unfolded position.

In summary, the present invention utilizes the communicating channel and the buffering component disposed in the communicating channel for communicating the first air bag disposed in the first chamber and the second air bag disposed in the second chamber. As a result, when one of the first chamber and the second chamber is compressed by an external force, the air inside the one of the first chamber and the second chamber is driven to vent outside via the discharging channel. At the same time, the corresponding one of the first air bag and the second air bag is deflated, so that the air inside the corresponding one of the first air bag and the second air bag can be driven to slowly flow into the other one of the first air bag and the second air bag via the communicating channel. Therefore, the present invention can provide a two-stage buffering operation, which enhances a buffering effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
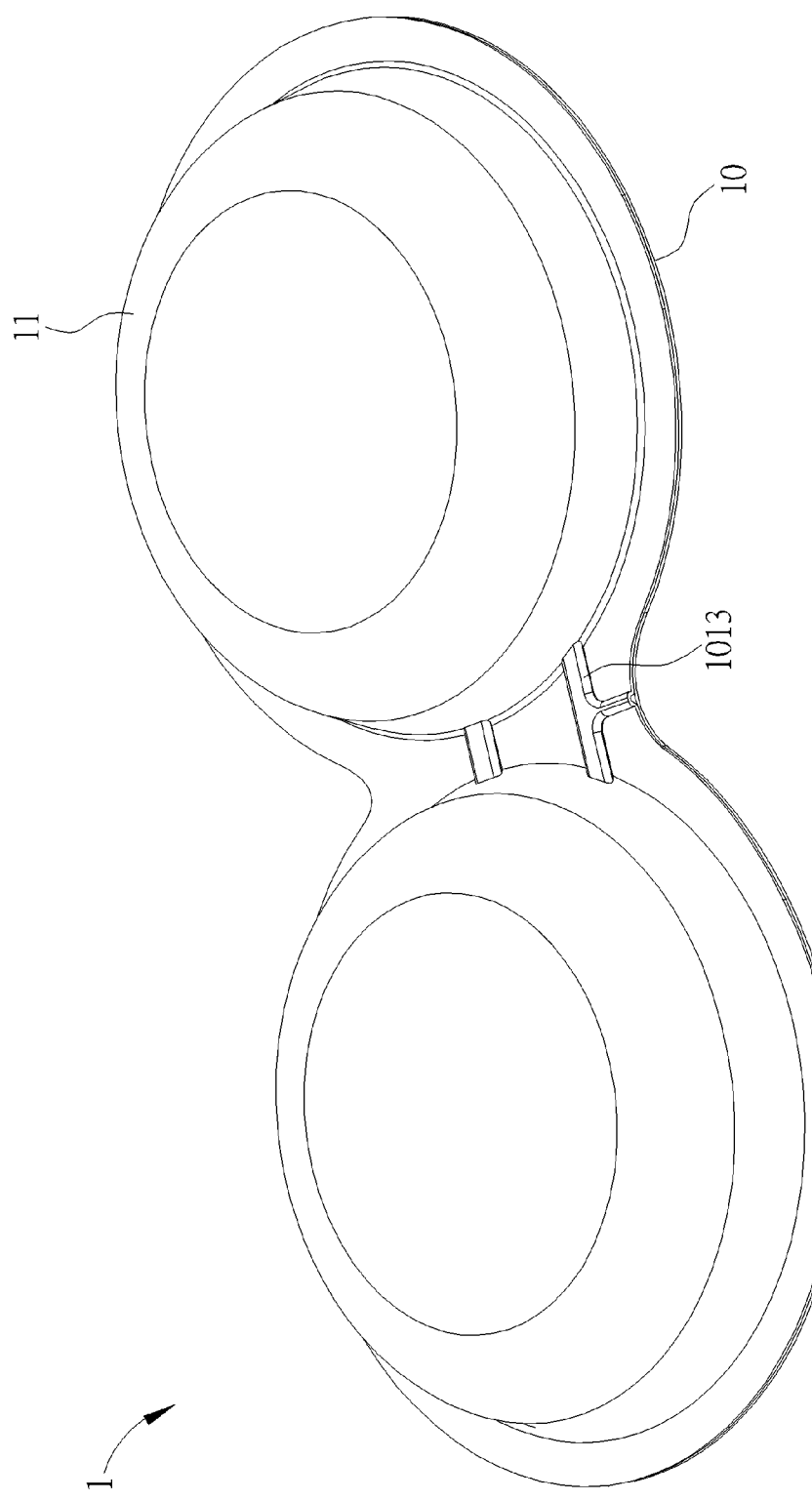
FIG. 1 is a schematic diagram of an impact absorbing structure according to a first embodiment of the present invention.
Figure 2:
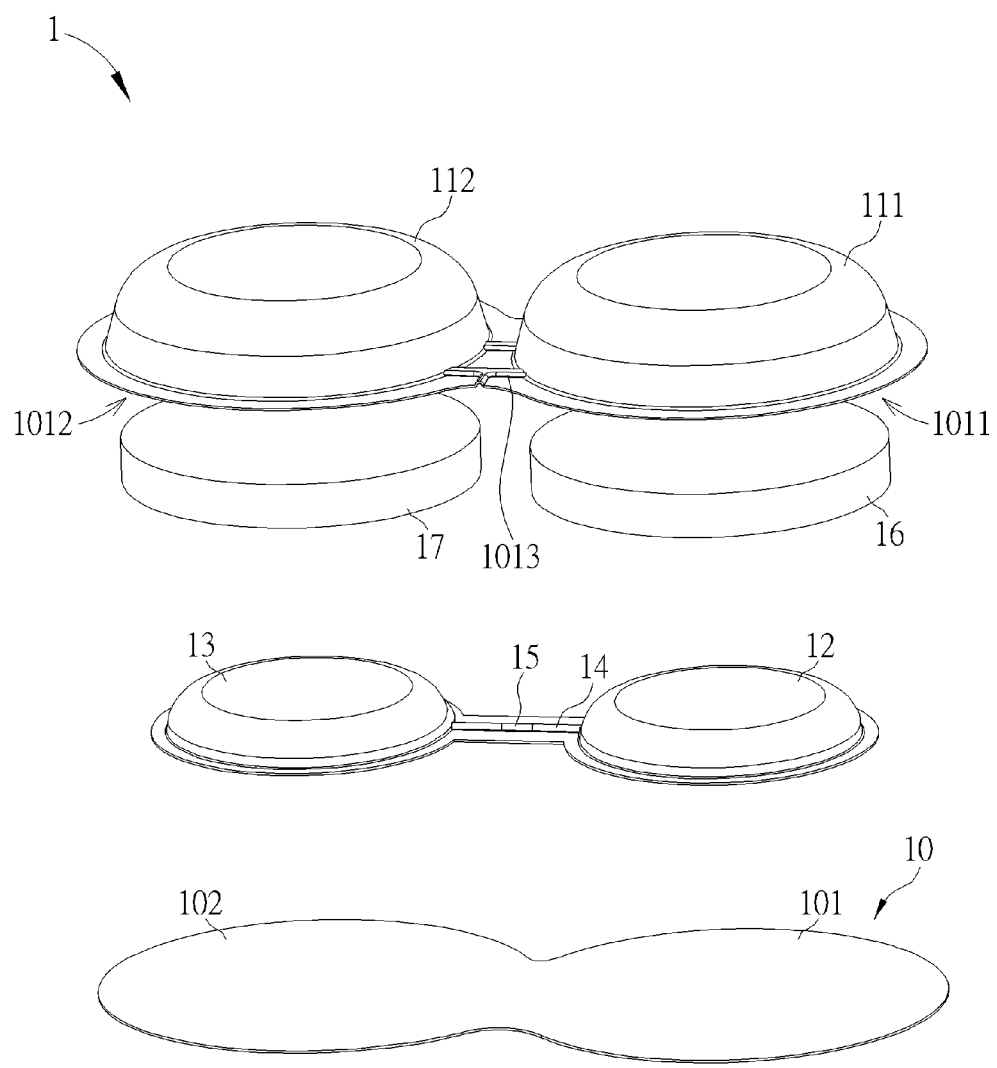
FIG. 2 is an exploded diagram of the impact absorbing structure according to the first embodiment of the present invention.

Please refer to FIG. 1 and FIG. 2. FIG. 1 is a schematic diagram of an impact absorbing structure 1 according to a first embodiment of the present invention. FIG. 2 is an exploded diagram of the impact absorbing structure 1 according to the first embodiment of the present invention. As shown in FIG. 1 and FIG. 2, the impact absorbing structure 1 includes a lower cover 10, an upper cover 11, a first air bag 12, a second air bag 13, a communicating channel 14, a buffering component 15, a first foam component 16 and a second foam component 17.

The lower cover 10 and the upper cover 11 can be made of Thermoplastic Polyurethane (TPU) material. Preferably, a thickness of each of the upper cover 11 and the lower cover 10 can be 0.35 mm. The upper cover 11 includes a first upper portion 111 and a second upper portion 112. The lower cover 10 includes a first lower portion 101 and a second lower portion 102. A first chamber 1011 is formed between the first upper portion 111 and the first lower portion 101 as the lower cover 10 and the upper cover 11 are combined. A second chamber 1012 is formed between the second upper portion 112 and the second lower portion 102 as the lower cover 10 and the upper cover 11 are combined. The first air bag 12 is disposed in the first chamber 1011, and the second air bag 13 is disposed in the second chamber 1012. The first air bag 12 and the second air bag 13 can be formed in a hemispherical shape and made of Thermoplastic Polyurethane (TPU) material. Preferably, a thickness of each of the first air bag 12 and the second air bag 13 can be 0.3 mm. The first air bag 12 and the second air bag 13 can absorb an external impact by air inflation and deflation.

The communicating channel 14 is installed between the first air bag 12 and the second air bag 13 for communicating the first air bag 12 and the second air bag 13. The communicating channel 14, the first air bag 12 and the second air bag 13 can be monolithically integrated. The buffering component 15 is installed in the communicating channel 14 for reducing a flowing rate of an air inside one of the first air bag 12 and the second air bag 13 flowing from the one of the first air bag 12 and the second air bag 13 into the other one of the first air bag 12 and the second air bag 13. In this embodiment, the buffering component 15 can be made of foam material, and the flowing rate of the air can be determined according to the porosity of the foam material. However, it is not limited to thereto.

Besides, in another embodiment, the impact absorbing structure 1 can further include a one-way valve or a two-way valve disposed in the communicating channel 14 for restraining a flowing direction of the air. For example, the one-way valve can be disposed in the communicating channel 14 for allowing the air to flow from the first air bag 12 toward the second air bag 13 but restraining the air to flow from the second air bag 13 toward the first air bag 12. However, in this embodiment, there is no valve disposed in the communicating channel 14, and therefore, the air is free to flow between the first air bag 12 and the second air bag 13.

The first foam component 16 is disposed in the first chamber 1011 and between the first air bag 12 and the first upper portion 111. The second foam component 17 is disposed in the second chamber 1012 and between the second air bag 13 and the second upper portion 112. However, the configuration of the first foam component 16 and the second foam component 17 are not limited to this embodiment. In another embodiment, the first foam component 16 also can be disposed between the first air bag 12 and the first lower portion 101, and the second foam component 17 also can be disposed between the second air bag 13 and the second lower portion 102. The first foam component 16 and the second foam component 17 can be laminated with a plurality of sponge layers, respectively.

A discharging channel 1013 is formed between the upper cover 11 and the lower cover 10 and communicated with the first chamber 1011, the second chamber 1012, and an outside of the impact absorbing structure 1 for venting air inside the first chamber 1011 and the second chamber 1012. In this embodiment, the discharging channel 1013 can be formed in a T shape. However, the shape and the configuration of the discharging channel 1013 are not limited to those illustrated in the figures in this embodiment.

Figure 3:
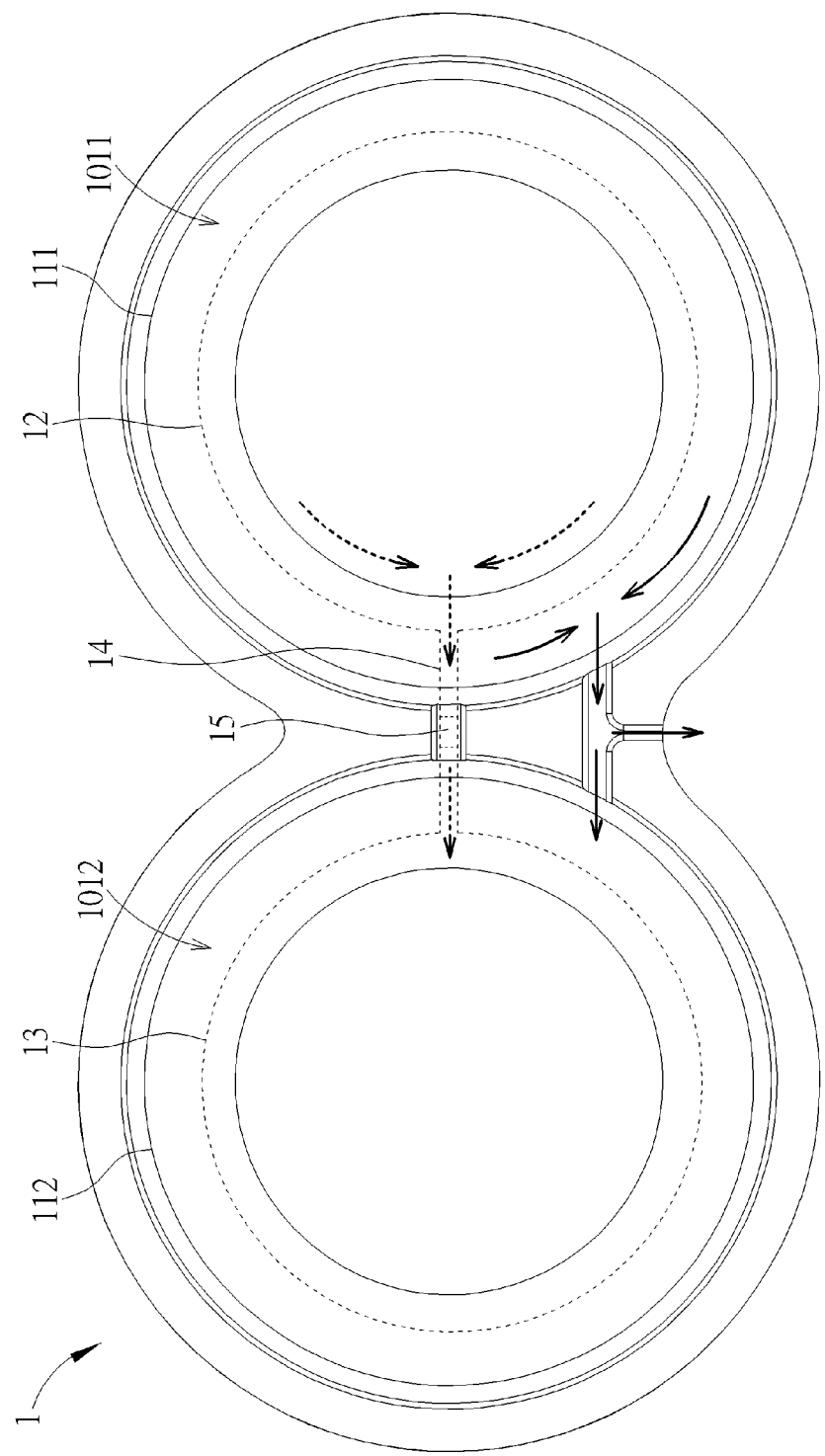
FIG. 3 is a diagram of the impact absorbing structure as an external force acts on the first upper portion of impact absorbing structure according to the first embodiment of the present invention.

Please refer to FIG. 2 and FIG. 3. FIG. 3 is a diagram of the impact absorbing structure 1 as an external force acts on the first upper portion 111 of impact absorbing structure 1 according to the first embodiment of the present invention. When the first upper portion 111 is forced by the external force, the first upper portion 111 is deformed to compress the first chamber 1011, so that an air inside the first chamber 1011 is driven to flow into the second chamber 1012 and toward the outside of the impact absorbing structure 1 via the discharging channel 1013 along solid arrow directions shown in FIG. 3. Furthermore, the first foam component 16 disposed in the first chamber 1011 is forced to be compressed and provides a resistant force against the external force, which extends operational period of deformation and ventilation of the first chamber 1011 and provides a first-stage buffering operation for absorbing an impact of the external force.

Afterward, the first air bag 12 is forced to be compressed by the first foam component 16, and an air inside the first air bag 12 is driven to flow through the communicating channel 14 into the second air bag 13 along dash arrow directions, as shown in FIG. 3. The buffering component 15 reduces a flowing rate of the air flowing from the first air bag 12 into the second air bag 13, and therefore, the first air bag 12 will not be deflated suddenly, which provides a second-stage buffering operation for absorbing the impact of the external force. Therefore, the impact absorbing structure 1 can provide an enhanced buffering effect by the aforementioned two-stage buffering operation.

Similarly, when another external force acts on the second upper portion 112, the second upper portion 112 is deformed to compress the second chamber 1012, so that an air inside the second chamber 1012 is driven to flow into the first chamber 1011 and toward the outside of the impact absorbing structure 1 via the discharging channel 1013. At the same time, the second air bag 13 is forced to be compressed by the second foam component 17, so that an air inside the second air bag 13 is driven to flow through the communicating channel 14 into the first air bag 12, which also provides two-stage buffering operation for absorbing an impact of the external force. Therefore, the impact absorbing structure 1 can provide an enhanced buffering effect by the aforementioned two-stage buffering operation.

Figure 4:
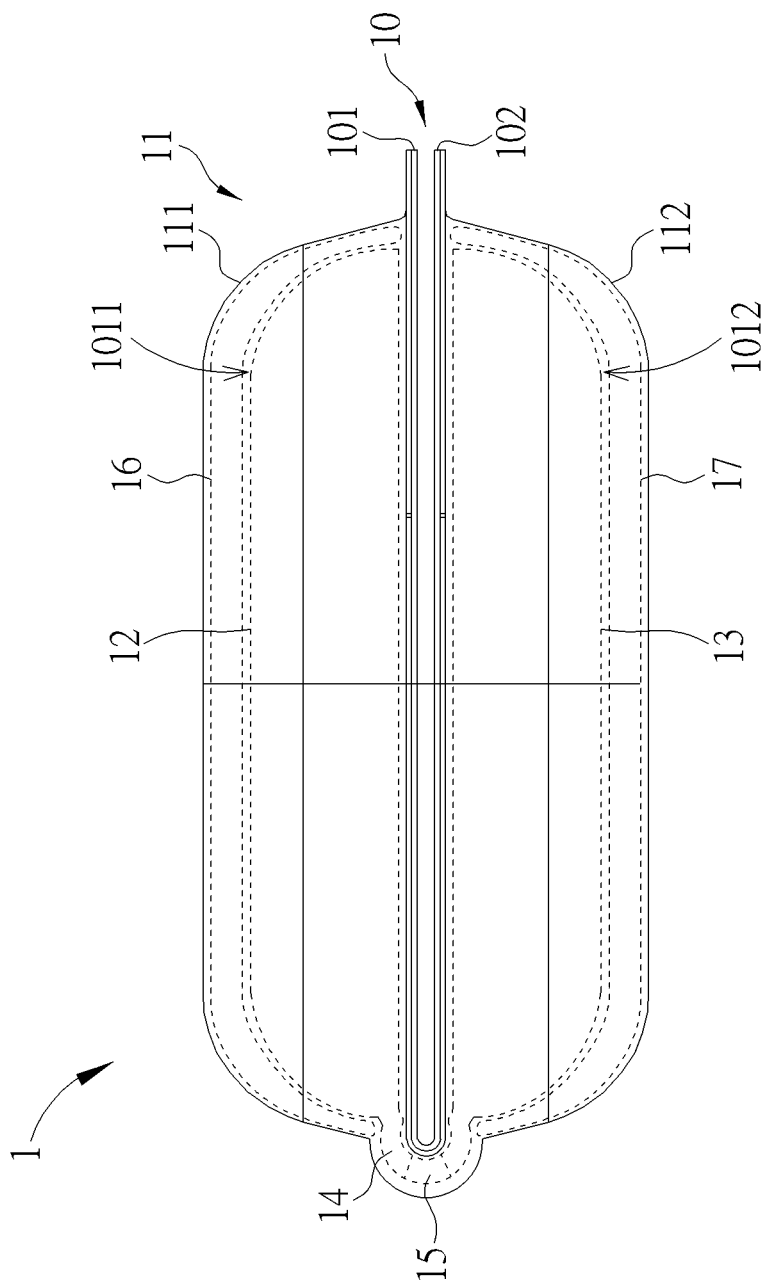
FIG. 4 is a diagram of the impact absorbing structure as the upper cover and the lower cover are located at a folded position according to the first embodiment.

Please refer to FIG. 1 and FIG. 4. FIG. 4 is a diagram of the impact absorbing structure 1 as the upper cover 11 and the lower cover 10 are located at a folded position according to the first embodiment. In this embodiment, the lower cover 10 and the upper cover 11 can be made of resilient material, so that the lower cover 10 and the upper cover 11 are bendable relative to each other. The first air bag 12 and the second air bag 13 can be stacked when the lower cover 10 and the upper cover 11 are bent at the folded position, as shown in FIG. 4. Furthermore, as shown in FIG. 1, the first air bag 12 and the second air bag 13 can be located in a same horizontal plane when the lower cover 10 and the upper cover 11 are not bent at an unfolded position.

Figure 5:
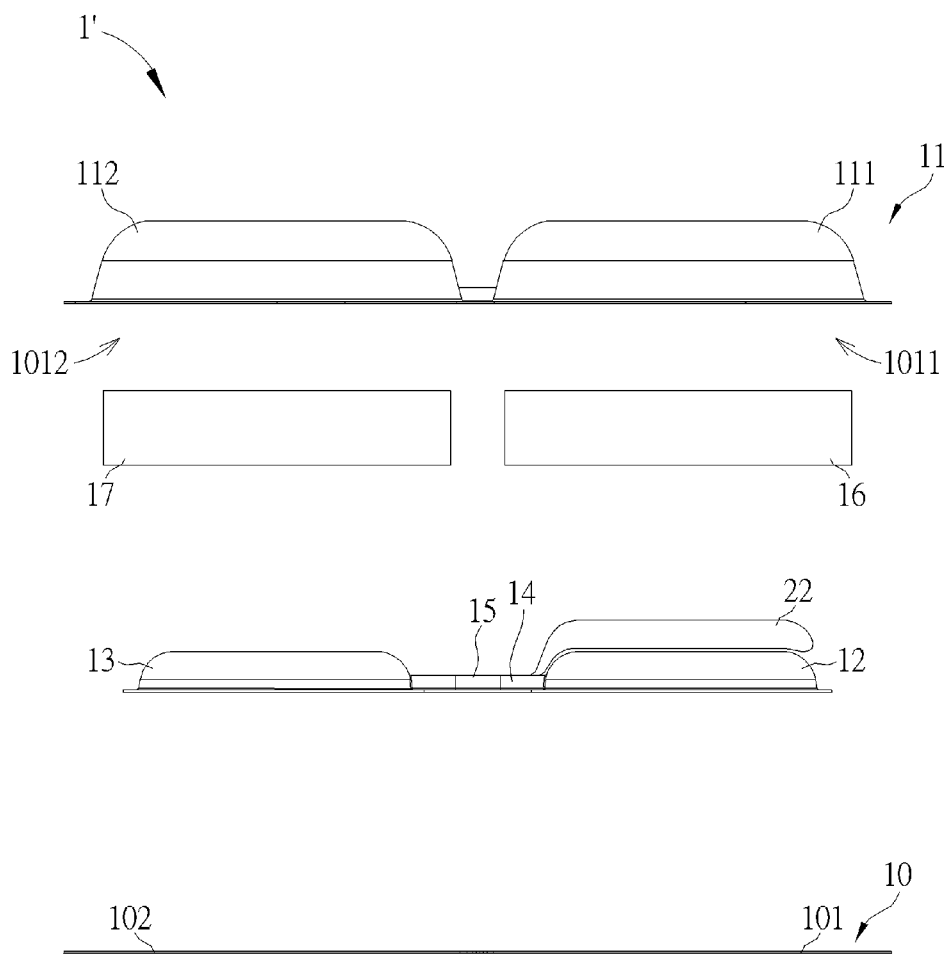
FIG. 5 is a diagram of an impact absorbing structure according to a second embodiment of the present invention.

However, the number of the air bag is not limited to the aforementioned embodiment. In other words, the impact absorbing structure 1 of the present invention can include more air bags other than the first air bag 12 and the second air bag 13. Please refer to FIG. 5. FIG. 5 is a diagram of an impact absorbing structure 1' according to a second embodiment of the present invention. Different from the impact absorbing structure 1 of the first embodiment, the impact absorbing structure 1' further includes a third air bag 22 disposed in the first chamber 1011 and communicated with the first air bag 12 and the second air bag 13 via the communicating channel 14. In other words, in this embodiment, the impact absorbing structure 1' has a one-to-many arrangement of the air bags. For simplicity, elements that have the same structures and functions as that illustrated in the aforementioned embodiment are provided with the same item numbers in this embodiment.

Figure 6:
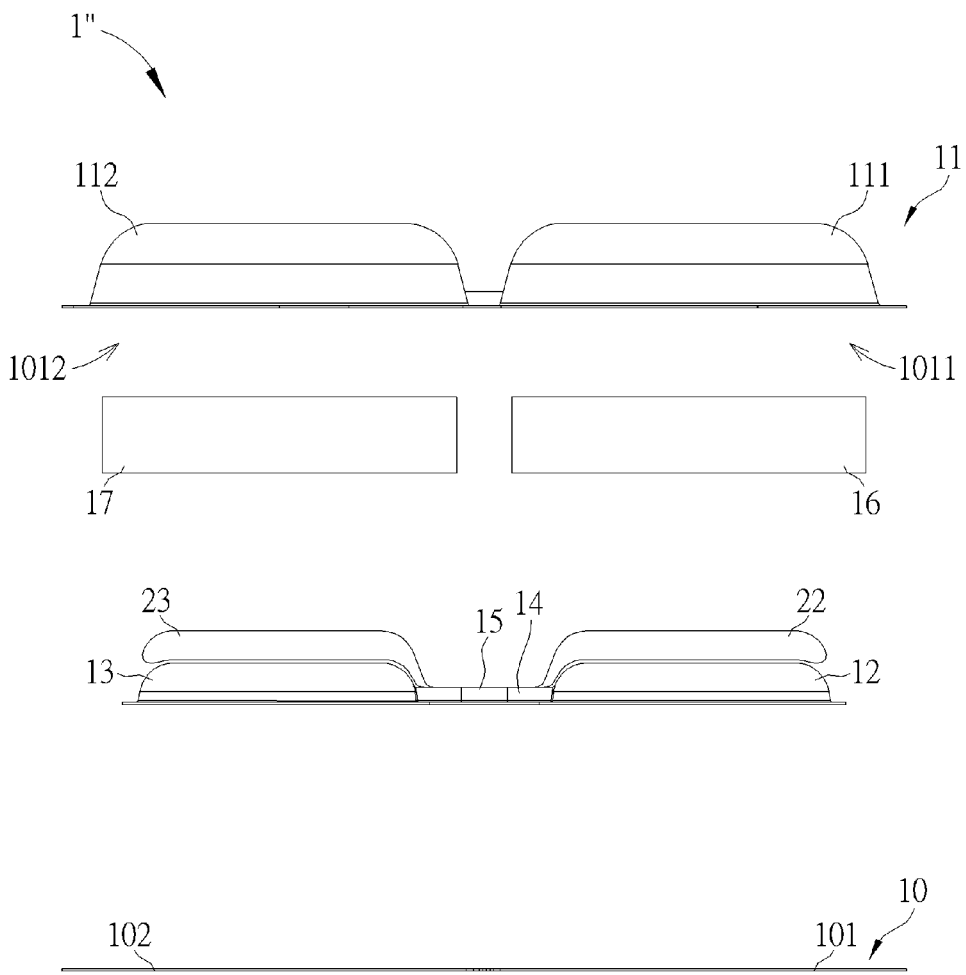
FIG. 6 is a diagram of an impact absorbing structure according to a third embodiment of the present invention.

Please refer to FIG. 6. FIG. 6 is a diagram of an impact absorbing structure 1" according to a third embodiment of the present invention. Different from the impact absorbing structure 1 of the first embodiment and the impact absorbing structure 1' of the second embodiment, the impact absorbing structure 1" further includes a fourth air bag 23 disposed in the second chamber 1012 and communicated with the first air bag 12, the second air bag 13, and the third air bag 22 via the communicating channel 14. In other words, in this embodiment, the impact absorbing structure 1" has a many-to-many arrangement of the air bags. For simplicity, elements that have the same structures and functions as that illustrated in the aforementioned embodiment are provided with the same item numbers in this embodiment.

In contrast to the prior art, the present invention utilizes the communicating channel and the buffering component disposed in the communicating channel for communicating the first airbag disposed in the first chamber and the second air bag disposed in the second chamber. As a result, when one of the first chamber and the second chamber is compressed by an external force, the air inside the one of the first chamber and the second chamber is driven to vent outside via the discharging channel. At the same time, the corresponding one of the first air bag and the second air bag is deflated, so that the air inside the corresponding one of the first air bag and the second air bag can be driven to slowly flow into the other one of the first air bag and the second air bag via the communicating channel. Therefore, the present invention can provide a two-stage buffering operation, which enhances a buffering effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An impact absorbing structure comprising:
    a lower cover comprising a first lower portion and a second lower portion;
    an upper cover covering the lower cover, the upper cover comprising a first upper portion and a second upper portion, a first chamber being formed between the first upper portion and the first lower portion, a second chamber being formed between the second upper portion and the second lower portion, the first chamber communicating with the second chamber, a discharging channel being formed between the upper cover and the lower cover and communicated with the first chamber, the second chamber and an outside of the impact absorbing structure, and an air inside one of the first chamber and the second chamber flowing into another one of the first chamber and the second chamber and toward the outside of the impact absorbing structure when the one of the first chamber and the second chamber is compressed;
    a first air bag disposed in the first chamber formed between the first lower portion of the lower cover and the first upper portion of the upper cover;
    a second air bag disposed in the second chamber formed between the second lower portion of the lower cover and the second upper portion of the upper cover;
    a communicating channel installed between the first air bag and the second air bag for communicating the first air bag and the second air bag; and
    a buffering component installed in the communicating channel for reducing a flowing rate of an air inside one of the first air bag and the second air bag flowing from the one of the first air bag and the second air bag into the other one of the first air bag and the second air bag;
    wherein when the one of the first air bag and the second air bag is compressed, the air inside the one of the first air bag and the second air bag is driven to flow into the other one of the first air bag and the second air bag through the communicating channel.

2. The impact absorbing structure of claim 1, wherein the buffering component is made of foam material.

3. The impact absorbing structure of claim 1, further comprising a one-way valve or a two-way valve disposed in the communicating channel for restraining a flowing direction of the air.

4. The impact absorbing structure of claim 1, wherein the discharging channel is formed in a T shape.

5. The impact absorbing structure of claim 1, further comprising:
    a first foam component disposed between the first air bag and the first upper portion or between the first air bag and the first lower portion;
    a second foam component disposed between the second air bag and the second upper portion or between the second air bag and the second lower portion.

6. The impact absorbing structure of claim 1, further comprising a third air bag disposed in the first chamber and communicated with the first air bag and the second air bag via the communicating channel.

7. The impact absorbing structure of claim 6, further comprising a fourth air bag disposed in the second chamber and communicated with the first air bag, the second air bag, and the third air bag via the communicating channel.

8. The impact absorbing structure of claim 1, wherein the lower cover and the upper cover are bendable, and the first air bag and the second air bag are stacked when the lower cover and the upper cover are bent at a folded position.

9. The impact absorbing structure of claim 8, wherein the first air bag and the second air bag are located in a same horizontal plane when the lower cover and the upper cover are not bent at an unfolded position.

\* \* \* \* \*